United States Patent Office 2,954,342
Patented Sept. 27, 1960

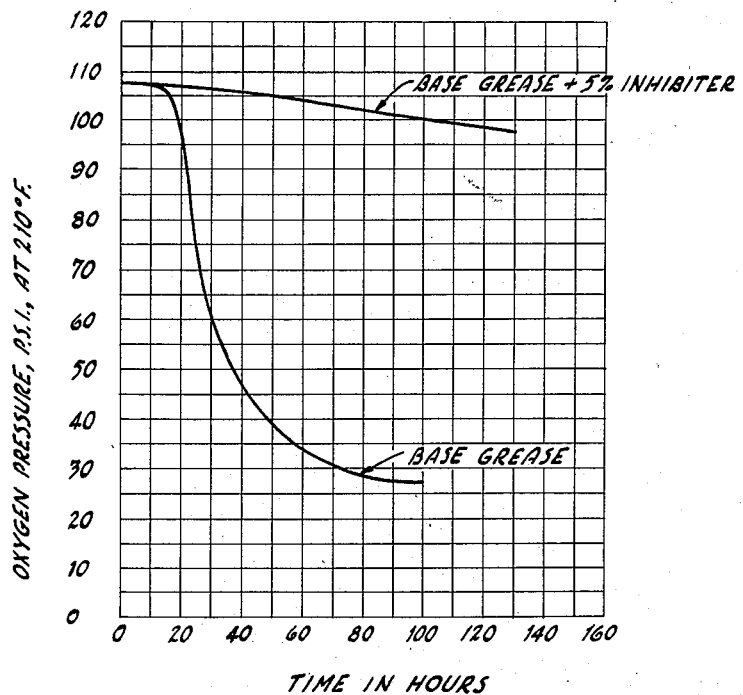

2,954,342

LUBRICATING GREASE COMPOSITIONS INHIBITED AGAINST OXIDATION

Bruce W. Hotten, Orinda, Calif., assignor to California Research Corporation, San Francisco, Calif., a corporation of Delaware Filed June 13, 1956, Ser. No. 591,049

7 Claims. (Cl. 252—32)

This invention relates to lubricating oil compositions, more particularly to greases. More specifically the invention relates to the inhibition of oxidation of lubricants, e.g., greases, at high temperatures, and to oxidation inhibitors effective for high temperature lubrication.

Modern usage and increasingly severe requirements necessitate, among other things, the use of oxidation inhibitors for lubricating oil compositions, for example, greases, which are capable of performance at high temperatures. Many inhibitors are available, e.g., tert. butyl phenols and hydroquinone, which are effective as oxidation inhibitors but which are volatile and evaporate from lubricating oil compositions at high temperature.

It is an object of the present invention to provide new compounds which are effective for inhibiting oxidation of lubricants, particularly greases, at high temperatures.

It is another object of the invention to provide lubricants, particularly greases, which are stable against oxidation at high temperatures.

It is a further object of the invention to inhibit the oxidation of high temperature greases with inhibitors which have a low volatility.

These and other objects of the invention will be apparent from the ensuing description and the appended claims.

In accordance with the present invention certain amides of ethylenediaminetetra-acetic acid, and/or certain homologues, are employed as oxidation inhibitors for lubricating oil compositions, particularly for greases. This class of compounds has been found to be highly effective for the purpose and the compounds have a desirably low volatility.

The inhibitors of the invention have the following type formula:

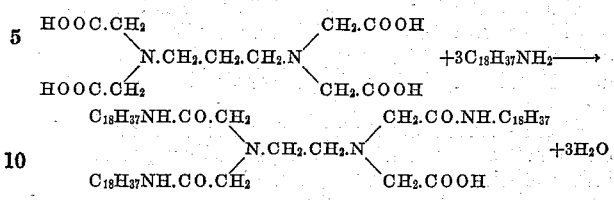

In the above type formula, R is an alkylene radical containing two or three carbon atoms (i.e., ethylene, trimethylene, propylene radicals); $R_1$, $R_2$, $R_3$ and $R_4$ are alkylene radicals containing one or two carbon atoms (i.e., methylene, ethylene and ethylidene radicals); $R_5$, $R_6$ and $R_7$ are saturated or unsaturated hydrocarbon radicals containing from 12 to 22 carbon atoms, e.g., aliphatic radicals containing 12 to 22 carbon atoms; and $R_8$ represents hydrogen, an ester radical or a metal.

That is, in the type formula above, R may be

—$CH_2.CH_2$-, or —$CH_2.CH_2.CH_2$-, or

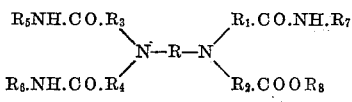

and $R_1$, $R_2$, $R_3$ and $R_4$ may be —$CH_2$-, or $CH_2.CH_2$- or

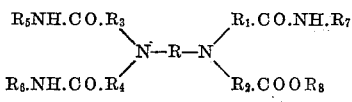

The following specific examples will serve further to illustrate the practice and advantages of the invention:

Example 1.—50 grams ethylenediaminetetra-acetic acid and 156 grams of "octadecylamine" were reacted by mixing and heating the reactants to 400° F. until evolution of water had ceased. The reaction which occurred was as follows:

$$\begin{array}{c} HOOC.CH_2 \quad\quad\quad CH_2.COOH \\ \diagdown\quad\quad\diagup \\ N.CH_2.CH_2.CH_2.N \quad\quad +3C_{18}H_{37}NH_2 \longrightarrow \\ \diagup\quad\quad\diagdown \\ HOOC.CH_2 \quad\quad\quad CH_2.COOH \end{array}$$

$$\begin{array}{c} C_{18}H_{37}NH.CO.CH_2 \quad\quad CH_2.CO.NH.C_{18}H_{37} \\ \diagdown\quad\quad\diagup \\ N.CH_2.CH_2.N \quad\quad\quad\quad +3H_2O \\ \diagup\quad\quad\diagdown \\ C_{18}H_{37}NH.CO.CH_2 \quad\quad CH_2.COOH \end{array}$$

The crude product was recrystallized from ethyl alcohol to yield a cream colored solid melting at 90–96° F. Analysis proved that only three of the carboxyls of ethylenediaminetetra-acetic acid reacted. Apparently steric hindrance or some other factor renders the fourth carboxyl difficult to react with the amine.

The "octadecylamine" used herein was a commercial preparation known as "Armeen HT," sold by the Armour Company, Chicago, Illinois, and containing 25% hexadecylamine, 70% octadecylamine, and 5% octadecenylamine. 85% of this mixture consists of n-primary amines.

Example 2.—Five grams of the recrystallized product of Example 1 were incorporated in 95 grams of a grease comprising approximately 88 parts by weight of a solvent refined California paraffin base oil having a viscosity of 480 SSU/100, the oil being thickened with 12% by weight of lithium stearate. The added inhibitor (product of Example 1) was incorporated by warming the grease to 200° F. and stirring in the inhibitor with a spatula. The inhibitor dispersed readily in the grease to form a stable dispersion.

The base grease (no inhibitor) and the same grease compounded with the product of Example 1 as described above, were subjected to ASTM D942–50 Oxidation Test. Results of the test are set forth in the graph illustrated in the accompanying drawing in which abscissae represents time in hours and ordinates represent oxygen pressure in pounds per square inch. The test was carried out at the standard temperature of 210° F. The initial pressure in both cases was approximately 108 p.s.i.

It will be noted that in 100 hours the pressure dropped only 7 lbs. in the case of the inhibited grease whereas in the same period of time in the case of the base grease the pressure dropped 81 lbs.

The specific inhibitor prepared as described in Example 1 and employed and tested as described in Example 2 and in the accompanying drawing, is derived from ethylenediamine, acetic acid and "octadecylamine". It will be apparent from the above teachings that the alkylenediamine, the carboxylic acid and the aliphatic amine may be varied within suitable limits. Examples of suitable alkylenediamines, carboxylic acids and aliphatic amines which may be employed as components of the inhibitors of the invention are set forth in the table below:

Table

| Alkylenediamine | Carboxylic acids | Aliphatic amines |
|---|---|---|
| $NH_2.CH_2.CH_2.NH_2$ ethylenediamine | $CH_3.COOH$ acetic acid | dodecylamine tetradecylamine hexadecylamine octadecylamine eicosylamine docosylamine |
| $NH_2.CH_2.CH_2.CH_2.NH_2$ trimethylenediamine | $CH_3.CH_2.COOH$ propionic acid [1] | |
| $NH_2.CH_2.CH.NH_2$<br>$\quad\quad\quad\; \mid$<br>$\quad\quad\quad CH_3$<br>propylenediamine | | |

[1] In compounds of the invention, the amino nitrogen may be attached to the alpha or the beta carbon atom.

Referring to the table and to the type formula hereabove, R' may be derived from any of the diamines listed in the left-hand column; $R_1$, $R_2$, $R_3$ and $R_4$ may be derived from any of the carboxylic acids in the middle column; and $R_5$ and $R_6$ and $R_7$ may be derived from any of the amines listed in the right-hand column. When $R_8$ of the above formula is an ester radical, such ester radical may be derived from monohydric alcohols having from 1 to 6 carbon atoms; for example, methanol, ethanol, and normal and branched chain propanols, butanols, hexanols, etc.

When $R_8$ is a metal, such a metal can be an alkali metal or an alkaline earth metal; for example, sodium, potassium, lithium, barium, calcium and strontium.

Specific examples are as follows:

Trioctadecylamide of ethylenediaminetetra-acetic acid
Tridodecylamide of ethylenediaminetetra-acetic acid
Trieicosylamide of ethylenediaminetetra-acetic acid
Trihexadecylamide of ethylenediaminetetra-acetic acid
Trioctadecylamide of trimethylenediaminetetra-acetic acid
Tridodecylamide of trimethylenediaminetetra-acetic acid
Trieicosylamide of ethylenediaminetetrapropionic acid($\alpha$)
Tridodecylamide of ethylenediaminetetrapropionic acid($\beta$)

Also esters and salts of the above; i.e., derivatives in which "$R_8$" is methyl, ethyl, propyl, etc. or sodium, potassium, lithium, barium, etc. may be employed.

The inhibitors of the invention are used in greases in small amount, generally between about 2% and 10% by weight, preferably about 2 to 6% by weight based on the finished grease. However, when such inhibitors are used in unthickened lubricating oils, amounts as low as 0.1% by weight may be used.

The inhibitors of the invention may be used in various types of lubricants, including lubricating oils and thickened lubricating oils such as greases. They are preferably used in greases. Representative oils are petroleum lubricating oils (naphthenic, paraffinic and mixed base oils); alkylene oxide polymers such as polypropylene oxide polymers; di-esters such as diisoamyl adipate, di-2-ethylhexyl azelate and di-2-ethylhexyl adipate, etc.

Where the oils are thickened to form grease, the thickeners may be of various types, e.g.: conventional soap type thickeners such as sodium, lithium and calcium stearates; salts of dibasic acid-diamine condensation products such as the product of condensing a molar excess of adipic acid with hexamethylene diamine, partially neutralizing the terminal carboxyls with n-decylamine, then forming the lithium or sodium salt (see Dixon application Serial No. 305,287, entitled "Polyamide-Polyamate Thickened Greases", filed August 19, 1952, now U.S. Patent No. 2,752,312); salts of monoamides of terephthalic acid of the type formula

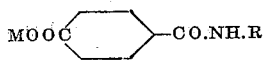

wherein R is a long chain aliphatic group such as tetradecyl, hexadecyl or octadecyl and M is the hydrogen equivalent of a metal, e.g., sodium or lithium; and mixtures of amic acid salts such as lithium hexadecyl adipamate and dibasic acid salts such as lithium adipamate (see Dixon Serial No. 305,288, "Amate-Dicarboxylate-Thickened Grease", filed August 19, 1952, now U.S. Patent No. 2,756,213).

Preferably the inhibitors of the present invention are employed in high temperature greases, by which is meant greases having dropping points by the ASTM D566-42 method not less than about 350° F. and which remain unctuous and do not become hard or brittle at 350° F. The inhibitors of the present invention are most advantageous in high temperature greases and in high temperature service because of their low volatility, their stability and their effectiveness at high temperature.

I claim:

1. A grease composition essentially of an oil of lubricating viscosity thickened to the consistency of a grease by an organic grease thickening agent and having incorporated therein in an amount sufficient to inhibit oxidation, a trialkylamide of an alkylenediamine tetraacetic acid.

2. A lubricating grease consisting essentially of a grease composition thickened with an organic grease thickening agent, which composition has incorporated therein from 2% to 6%, by weight, of a tridodecyl amide of an alkylene diamine tetraacetic acid, wherein said alkylene radical contains from 2 to 3 carbon atoms.

3. A lubricating grease composition consisting essentially of a grease composition thickened with an organic grease thickening agent, which composition has incorporated therein from 2% to 6%, by weight, of a trioctadecyl amide of ethylene diamine tetraacetic acid.

4. A lubricating grease composition consisting essentially of an oil of lubricating viscosity and an organic grease thickening agent in an amount sufficient to thicken said oil to the consistency of a grease, and from 2% to 6%. by weight, of a triamide of an alkylenediamine tetracarboxylic acid of the formula:

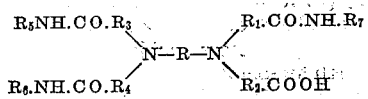

wherein R is an alkylene radical containing from 2 to 3 carbon atoms, $R_1$, $R_2$, $R_3$ and $R_4$ are alkylene radicals containing from 1 to 2 carbon atoms, and $R_5$, $R_6$ and $R_7$ are hydrocarbon radicals containing from 12 to 22 carbon atoms.

5. The grease composition of claim 4 wherein the grease thickening agent is a metal salt of an organic acid.

6. The grease composition of claim 4 wherein said oil of lubricating viscosity is a petroleum oil.

7. The grease composition of claim 4 wherein $R_1$, $R_2$, $R_3$ and $R_4$ are methylene radicals, and $R_5$, $R_6$ and $R_7$ are aliphatic radicals containing from 12 to 22 carbon atoms.

References Cited in the file of this patent

UNITED STATES PATENTS

| | | |
|---|---|---|
| 1,534,525 | Hartman et al. | Apr. 21, 1925 |
| 2,191,738 | Balle | Feb. 27, 1940 |
| 2,347,494 | Meigs | Apr. 25, 1944 |
| 2,357,283 | Peters | Sept. 5, 1944 |
| 2,560,743 | Rhines | July 17, 1951 |
| 2,631,978 | Bersworth | Mar. 17, 1953 |
| 2,640,812 | Bryant | June 2, 1953 |
| 2,680,094 | Bartlett et al. | June 1, 1954 |
| 2,700,612 | Chenicek | Jan. 25, 1955 |
| 2,780,598 | Cafcas | Feb. 5, 1957 |
| 2,805,203 | Knapp et al. | Sept. 3, 1957 |

OTHER REFERENCES

Sequestrene, Geigy Industrial Chemicals (1952).